B. M. NYCE. 2 Sheets--Sheet 1.

Improvement in Preserving Fruit and other Perishable Substances.

Reissued March 5, 1872.

No. 4,784.

Witnesses:

Thomas Nicholls.
Wm. H. King.

Inventor:

Benjamin M. Nyce.
by George Dawson
his Attorney.

B. M. NYCE.

2 Sheets--Sheet 2.

Improvement in Preserving Fruit and other Perishable Substances.

No. 4,784.

Reissued March 5, 1872.

Witnesses:

Thomas Nicholls.
Wm. H. King.

Inventor:

Benjamin M. Nyce.
by George Payson his Attorney

UNITED STATES PATENT OFFICE.

BENJAMIN M. NYCE, OF CLEVELAND, OHIO.

IMPROVEMENT IN PRESERVING FRUITS AND OTHER PERISHABLE SUBSTANCES.

Specification forming part of Letters Patent No. 21,977, dated November 2, 1858; reissue No. 1,068, dated October 23, 1860; reissue No. 1,960, dated May 16, 1865; reissue No. 2,037, dated July 25, 1865; reissue No. 4,784, dated March 5, 1872.

SPECIFICATION.

Figure 1:
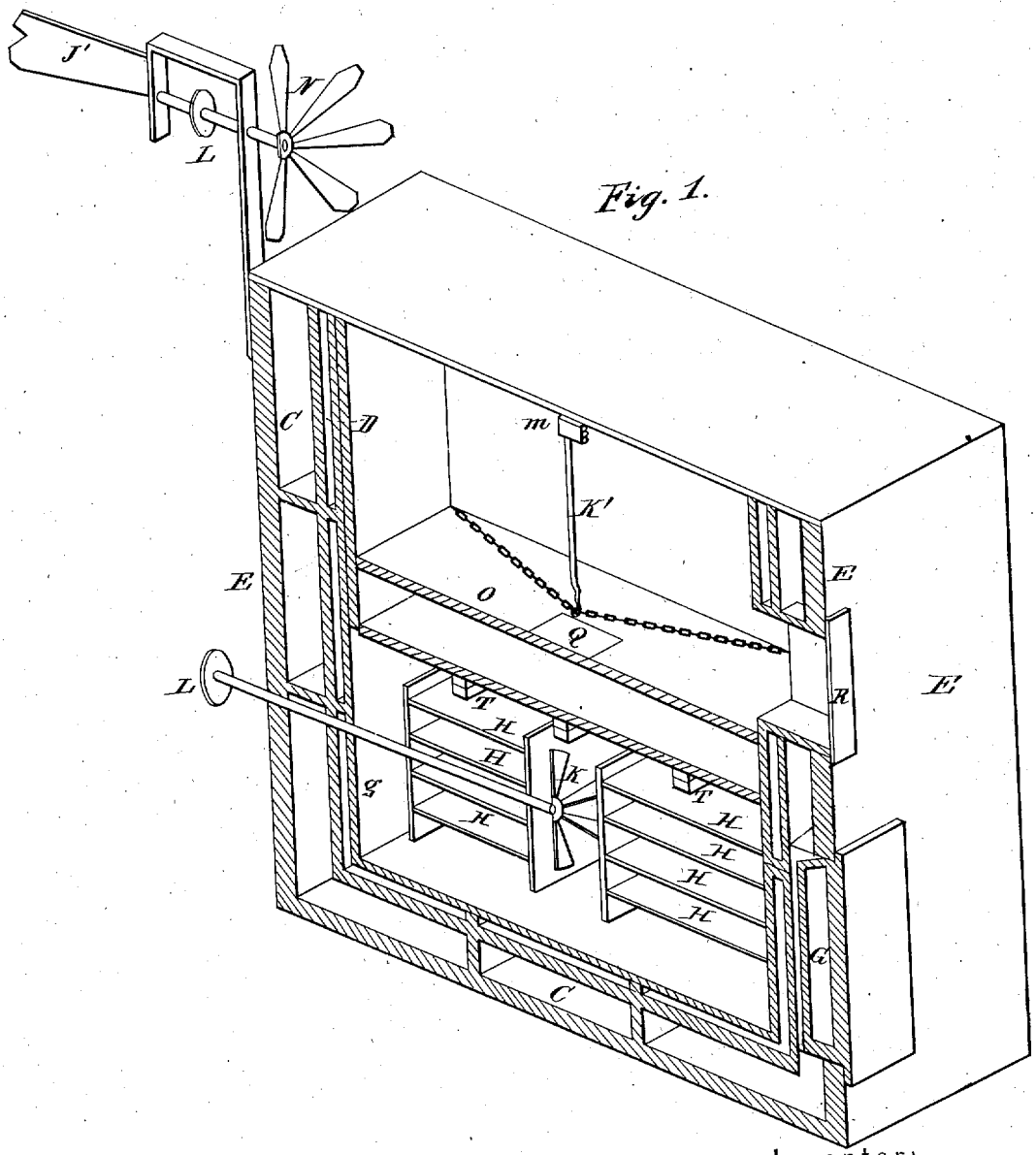
Figure 2:
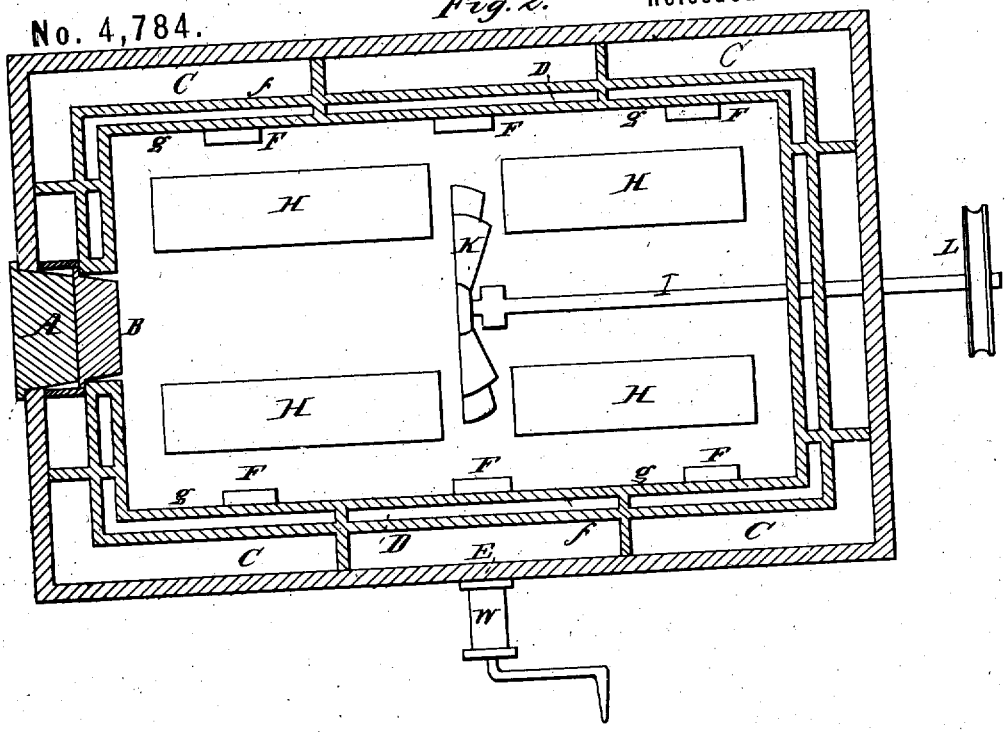
Figure 3:
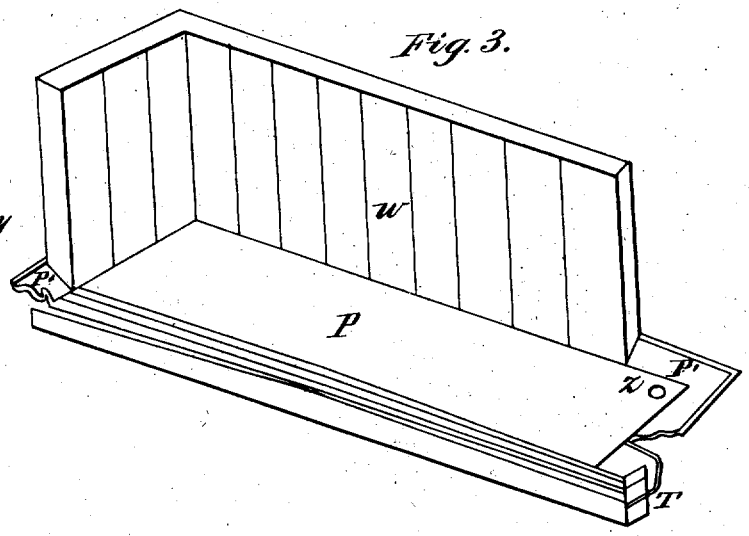
Figure 4:
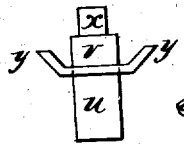

I, BENJAMIN M. NYCE, of Cleveland, Cuyahoga county and State of Ohio, have invented certain Improvements in Preserving Fruit and other Perishable Substances, of which the following is a specification:

Figure 1 shows, by a vertical section and in perspective, the interior of a house, chamber, or refrigerator adapted to my purpose. Fig. 2 is a horizontal section, showing the construction of the walls and the position of the shelves and ventilators. Fig. 3 is a perspective view of a portion of the ice-reservoir with one of its supporting-beams. Fig. 4 is a transverse section of a supporting-beam.

In constructing a house embodying my invention, the surface of the ground should first be leveled and coated with some substance impervious to moisture, such as pitch, asphaltum, hydraulic cement, or mastic. If any resinous or bituminous substances are used, they should be covered with sheet metal, cement, or other inodorous substance. On this bed there is spread and closely packed a layer of chaff of some three or four feet thick, over which is placed a tight floor of boards tongued and grooved, or of sheet metal or cemented tiles, or any other suitable material. The inclosing-walls should be as nearly air and heat tight as possible. They may be made of brick or stone, or wood or iron, or other suitable material. They should be made double, or, if desired, even treble, with spaces between filled with chaff or tan-bark, or other suitable non-conducting material. If of metal, the edges should be painted and closely nailed together. The inside surface of the outer wall, if of stone or brick, may be plastered with roofing-cement or any other similar material. These walls are shown in the drawing at E and *g*. The entrance to the preserving-chamber should be guarded by two or more doors, so as to avoid direct communication between the inner and outer air. These doors should be double, and filled with some non-conductor like the walls, and the joints made tight with listing saturated with tallow, or by other suitable means.

P in Fig. 3 is a metallic floor resting on the beams T, Figs. 1 and 3. The best material for this floor, I think, is galvanized sheet-iron. It ought to be made tight by riveting and soldering, so as to prevent leakage or the passage of air and moisture. The beams T may be all of wood, or, where greater cold is desired, they may be of wood below with metal above, as shown at *x* in Fig. 4, thus allowing a more rapid conduction of heat. *y* is a metallic trough for carrying off condensed vapor. The floor should slope slightly toward one or more ventages or discharging-pipes, Z, Fig. 3, to carry off the water from the melting ice. The ice is stored upon this floor in the upper chamber of the house in any proper quantity, according to the strength of the floor, the size of the house, and the necessities of the business. P′ is a rim supporting an inner wall, *w*, Fig. 3. O, Fig. 1, is a movable air-tight cover, made to fit snugly to the sides of the ice-reservoir, so as to insulate its lower portion, containing the ice, from its upper portion, which, after placing the ice-cover O, is packed with some non-conducting material. The insulation of the two compartments of the ice-reservoir may be made more complete by the application of tarred canvas or other luting to the edge of the cover O. This cover may be raised and lowered by means of the rope K′ passing over the pulley *m*. Q is an opening in the cover. Fans K, Figs. 1 and 2, may be used to stir the air in the preserving-chamber; but I do not consider this essential, as the slight variation of temperature, from chemical or other causes, will generally produce all necessary circulation. In order to absorb the moisture in the preserving-chamber, I make use of chloride of calcium or magnesium, or other similar substances. These may be spread out in pans or troughs, or other suitable receptacles, below the ice-floor. H H, Figs. 1 and 2, represent the tables or shelves used to hold the fruit or other similar articles. If the preserving-chamber is large, and it is desired to keep a variety of delicate articles, the chamber may be divided into compartments by sheet-metal partitions. The fans K are driven by the windmill N by means of the wheels L and shaft I. A and B are doors to the preserving-chamber. F F are parts of frame to sustain the ice-cover. W is a windlass to raise the ice-cover. But none of these parts are now essential. R is a window closed by a thick non-conducting shutter.

The description above given is more particularly applicable to houses or rooms for preserving fruit and other articles requiring the greatest cold and dryness and most perfect insulation. For other coarser purposes, such as preserving beer and the like, less care is required. The walls and foundation may be made less perfect and the absorbents dispensed with altogether. The metallic floor ought still, in my judgment, to be tight; but this is not indispensable. The leakage may be carried off by troughs or other means, and the ordinary dampness, which would be fatal to fruit, is here less prejudicial.

The main feature of my invention consists, then, as will readily be seen, in the air-tight casings of walls and in the use of a metallic floor, through which the cold of the ice is sent down into the chamber below. For all nicer purposes this floor should rest on metal, and should be as nearly tight as possible; but for many other purposes it will answer nearly, and perhaps quite, as well if less carefully constructed.

What I claim as my invention, and desire to secure by Letters Patent, is—

1. A house provided with a metallic floor, suitably supported by girders, having a preserving-chamber below and a sufficient supply of ice above said floor to cool the chamber through the medium of the floor, substantially as described.

2. The metallic floor, as in the first claim, in combination with absorbents, substantially as described.

3. Making the outer walls air-tight, substantially as hereinabove described, in combination with a chamber cooled by ice on a metallic floor.

BENJAMIN M. NYCE.

Witnesses:
S. E. HAMILTON,
S. F. PIFER.